Patented Oct. 12, 1926.

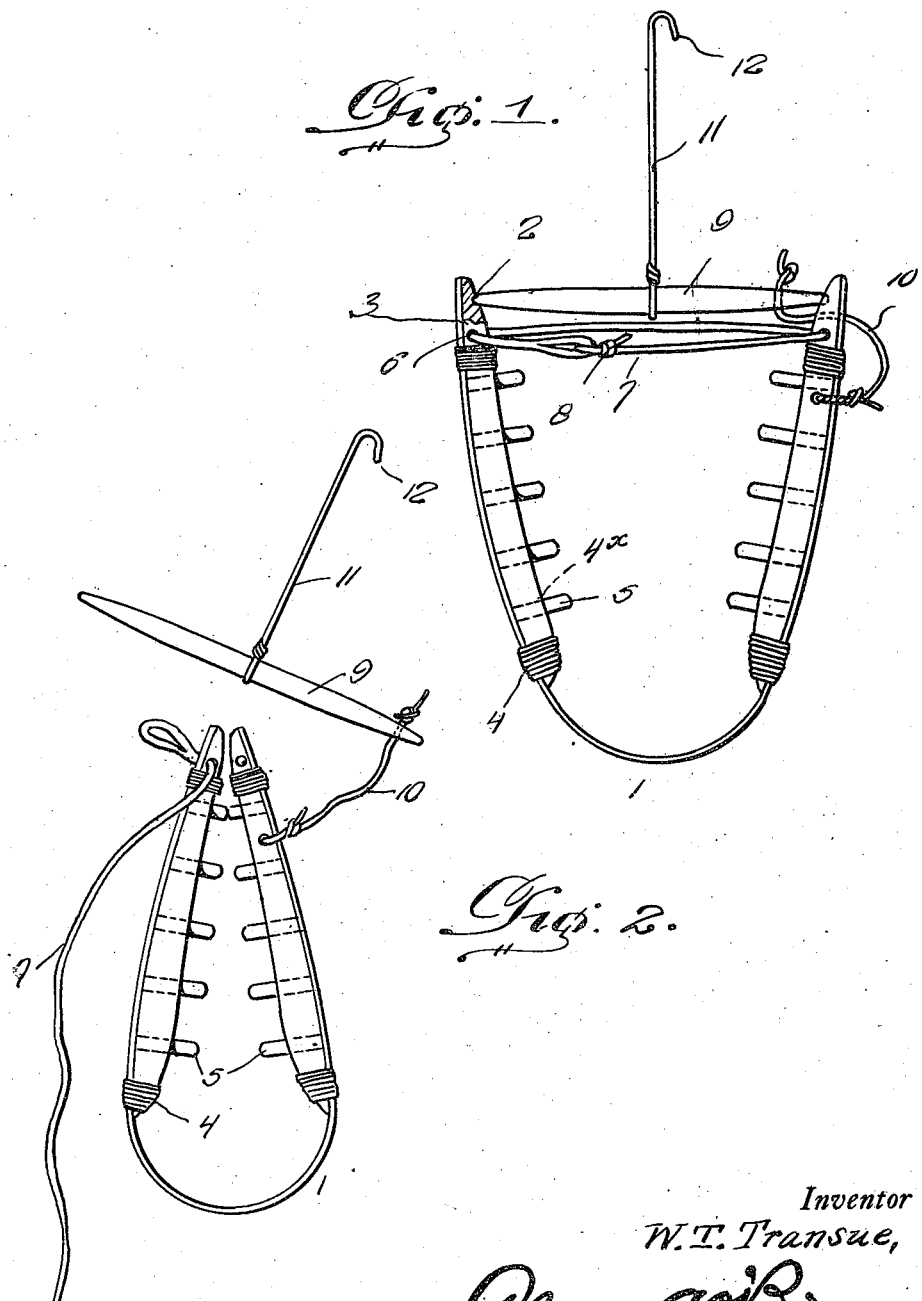

1,603,222

UNITED STATES PATENT OFFICE.

WILLIAM T. TRANSUE, OF NORTH WATER GAP, PENNSYLVANIA.

DOG-TRAINING DEVICE.

Application filed December 21, 1925. Serial No. 76,701.

My present invention has to do with the training of hunting dogs, and contemplates the provision of a device which while simple and inexpensive in construction is adapted to imbue a dog with the importance of promptly obeying a master's voice or whistle.

To the attainment of the foregoing, the invention consists in the improvement as hereinafter described and definitely claimed.

In the accompanying drawings, forming part of this specification:—

Figure 1 is a view illustrating the preferred embodiment of my invention in set position.

Figure 2 is a similar view showing the device after it is sprung in the manner hereinafter described.

Similar numerals of reference designate corresponding parts in both views of the drawings.

In the present and preferred embodiment of my invention, the device includes among other elements a yoke 1. The said yoke is preferably of tempered spring steel, and is provided adjacent to its free ends with seats 2, the said seats 2 being formed in hard wood sections 3 disposed at the inner sides of the arms of the yoke and connected thereto by wrappings 4 or any other appropriate means. The wooden sections 3 are provided at intervals in their length with apertures 4ˣ, and in the said apertures are arranged and secured by frictional contact or otherwise pegs 5 which extend inwardly from the wooden sections 3 to about the proportional distance illustrated in Figure 1. The wooden sections 3 are moreover provided with apertures 6 for the passage of a thong or cord 7, designed to be tied as designated by 8 in Figure 1.

In addition to the yoke 1 characterized and equipped in the manner described, my improvement comprises a trigger bar 9, which is loosely connected through the medium of a cable 10 with one of the wooden sections 3, the connection described being employed in order to preclude loss of the said trigger 9. Connected to and extending at substantially right angles from the trigger or trigger bar 9 is a rod 11 which may be of wire or other appropriate material and is provided at its outer end with a hook 12.

In the practical use of my improvement, the yoke 1 is placed about neck of the dog to be trained, and the trigger bar or prop bar 9 is interposed between the free portions of the yoke and so that the ends of the bar are disposed in the seats 2 of the yoke. With the bar 9 relatively arranged as shown in Figure 1 and as described in the foregoing, it will be manifest that the bar 9 will preclude any pressure of the pegs 5 against the neck of the animal. When, however, the bar 9 is displaced, the spring capacity of the yoke 1 will yieldingly move the arms of the yoke inwardly and hence the pegs 5 will press against the neck of the dog and give rise to considerable discomfort. My invention contemplates the springing of the yoke and the subjection of the dog to discomfort in the event of the bar 9 being displaced by the dog encountering a fence, bush or the like in which the hook 12 will catch. In the event of the said hook 12 catching into an object while the dog is ranging a field the subjection of the dog to discomfort will immediately ensue. It is the province of the master or trainer at this time to whistle or call the dog, and by virtue of the concurrent discomfort inflicted on the dog and the master's call or whistle, the dog will soon come to know that when he is subjected to discomfort the first to go for release is to the master, and therefore the dog will soon learn the importance of prompt obedience to the master's whistle or call.

The specific embodiment of my invention herein disclosed is advantageous for the reasons hereinbefore pointed out and also because of its lightness and the fact that when in normal state as shown in Figure 1, it will not interfere in any appreciable degree with the ranging of a dog in a field or through the woods. I do not desire, however, to be understood as confining myself to the disclosed specific construction, my invention being defined by my appended claims within the scope of which structural changes and changes in relative arrangement may be made without departure from my invention.

Having described my invention, what I claim and desire to secure by Letters-Patent, is:—

1. An animal training device, comprising a spring yoke having seats adjacent to its ends and also having at the inner sides of its arms inwardly extending projections, and a trigger bar or prop adapted to be removably interposed between the arms of the yoke and arranged in the seats thereof and having means adapted to catch into objects with a view to bringing about displacement of the trigger bar during ranging of the animal equipped with the device.

2. An animal training device, comprising a spring yoke having seats adjacent to its ends and also having at the inner sides of its arms inwardly extending projections, and a trigger bar or prop adapted to be removably interposed between the arms of the yoke and arranged in the seats thereof and having means adapted to catch into objects with a view to bringing about displacement of the trigger bar during ranging of the animal equipped with the device; the said yoke being provided at the inner sides of its arms with wooden sections having depressions constituting the said seats, the inward projections being formed by pegs seated in the said wooden sections.

3. A dog training device comprising a spring metal yoke, longitudinal wooden sections arranged at the inner sides of the arms of said yoke and connected to said arms and having apertures at intervals in their lengths and also having seats in their inner sides adjacent to the ends of the yoke, pegs in the apertures of said sections, and a trigger bar or prop interposed between the arms of the yoke and disposed removably at its ends in the said seats and equipped with a bar carrying a hook.

In testimony whereof I affix my signature.

WILLIAM T. TRANSUE.